US012782257B2

(12) United States Patent
Sumi

(10) Patent No.: US 12,782,257 B2
(45) Date of Patent: Nov. 3, 2026

(54) REPLACEMENT END TIME DETERMINATION METHOD, SUBSTRATE PROCESSING METHOD, AND SUBSTRATE PROCESSING APPARATUS

(71) Applicant: SCREEN Holdings Co., Ltd., Kyoto (JP)

(72) Inventor: Noritake Sumi, Kyoto (JP)

(73) Assignee: SCREEN HOLDINGS CO., LTD. (JP)

( * ) Notice: Subject to any disclaimer, the term of this patent is extended or adjusted under 35 U.S.C. 154(b) by 280 days.

(21) Appl. No.: 18/421,871

(22) Filed: Jan. 24, 2024

(65) Prior Publication Data

US 2024/0255404 A1 Aug. 1, 2024

(30) Foreign Application Priority Data

Jan. 26, 2023 (JP) ................................ 2023-010147

(51) Int. Cl.
*G01N 9/36* (2006.01)
*G06Q 10/20* (2023.01)

(52) U.S. Cl.
CPC ............... *G01N 9/36* (2013.01); *G06Q 10/20* (2013.01)

(58) Field of Classification Search
CPC . G01N 9/36; G01N 9/32; G06Q 10/20; H10P 70/80; H10P 72/0408; H10P 72/0604
See application file for complete search history.

(56) References Cited

U.S. PATENT DOCUMENTS

2018/0138058 A1 5/2018 Egashira et al.
2020/0020550 A1 1/2020 Goshi et al.
2020/0090958 A1 3/2020 Kiyose
2020/0411336 A1* 12/2020 Sumi ......................... B08B 3/08
(Continued)

FOREIGN PATENT DOCUMENTS

JP 2007-152195 A 6/2007
JP 2012-243776 A 12/2012
(Continued)

OTHER PUBLICATIONS

Notice of Allowance issued Feb. 6, 2025 for corresponding Korean Patent Application No. 10-2024-0010242 with English translation attached.
(Continued)

*Primary Examiner* — Thomas M Hammond, III
(74) *Attorney, Agent, or Firm* — OSTROLENK FABER LLP

(57) ABSTRACT

In a replacement end time determination method in accordance with the present invention, in a dry state where a liquid to be replaced is not present in a chamber, a processing fluid is supplied and discharged in accordance with a predetermined supply/discharge recipe, and while the processing fluid is maintained in a supercritical state, a density profile is acquired to be used as a reference profile. A difference between the density profile acquired in a wet state where the liquid to be replaced is present in the chamber and the reference profile is accumulated, and on the basis of a comparison between the accumulated value and a threshold value set for the accumulated value, a replacement end time is determined.

10 Claims, 7 Drawing Sheets

(56) References Cited

U.S. PATENT DOCUMENTS

| | | | | |
|---|---|---|---|---|
| 2022/0189765 | A1 * | 6/2022 | Jeong | H10P 70/80 |
| 2022/0301895 | A1 * | 9/2022 | Gosho | H10P 70/80 |

FOREIGN PATENT DOCUMENTS

| | | | |
|---|---|---|---|
| JP | 2018-081966 | A | 5/2018 |
| JP | 7004707 | B2 | 1/2022 |
| JP | 2022-115405 | A | 8/2022 |
| JP | 2022-142723 | A | 9/2022 |
| KR | 10-2012-0127203 | A | 11/2012 |
| KR | 10-2019-0126140 | A | 11/2019 |
| KR | 10-2022-0129467 | A | 9/2022 |

OTHER PUBLICATIONS

Decision to Grant a Patent dated Oct. 1, 2024 for corresponding Japanese Patent Application No. 2023-010147 with English translation.

* cited by examiner

REPLACEMENT END TIME DETERMINATION METHOD, SUBSTRATE PROCESSING METHOD, AND SUBSTRATE PROCESSING APPARATUS

CROSS REFERENCE TO RELATED APPLICATION

The disclosure of Japanese Patent Application No. 2023-010147 filed on Jan. 26, 2023 including specification, drawings and claims is incorporated herein by reference in its entirety.

BACKGROUND OF THE INVENTION

1. Field of the Invention

This invention relates to a technique for replacing a liquid to be replaced by a processing fluid in a supercritical state in a chamber, and more particularly to a method of determining an end time of replacement.

2. Description of the Related Art

The process of processing various substrates such as a semiconductor substrate, a glass substrate for a display apparatus, and the like includes processing of a surface of a substrate with various processing fluids. Although processing using liquids such as chemicals, rinses, and the like as the processing fluids has been widely performed conventionally, processing using supercritical fluids has been put into practical use in recent years. In particular, in the processing of a substrate having a fine pattern formed on its surface, a supercritical fluid having a lower surface tension than a liquid penetrates deep into gaps among the pattern, whereby the processing can be performed efficiently. In addition, the risk of pattern collapse due to the surface tension can be reduced in a drying process.

JP2018-081966A (PTL 1), for example, discloses a substrate processing apparatus for drying a substrate by replacing a liquid adhering to the substrate by a supercritical fluid. More specifically, in PTL 1, described in detail is a flow of a drying process in the case of using carbon dioxide as a supercritical processing fluid and using IPA (isopropyl alcohol) as a liquid to be replaced by carbon dioxide. In this process, the inside of a chamber accommodating the substrate is filled with the supercritical fluid, and after the supercritical fluid containing the replaced liquid is discharged, the substrate is dried by decompressing the chamber and vaporizing the supercritical fluid.

When the vaporization of the supercritical fluid is started with the liquid to be replaced remaining in the chamber, the liquid to be replaced adheres to the substrate again, which may cause a drying failure. For this reason, it is necessary to control the vaporization of the supercritical fluid to be started after the liquid to be replaced is completely discharged from the chamber. In this regard, in JP2022-115405A (PTL 2) that the present applicant precedently disclosed, proposed is a technique for determining an end time of replacement, from a density change of the processing fluid discharged from the chamber. This technique pays attention to the knowledge that a density profile representing a time change of the density of the discharged processing fluid in a wet state where the liquid to be replaced is still contained in the processing fluid is different from that in a dry state where the liquid to be replaced is not contained in the processing fluid. Specifically, it is determined that the replacement is ended when the density profile in the wet state coincides with that in the dry state.

The density of the processing fluid can be detected by, for example, a mass flow meter. However, it is inevitable that there arises a variation in the detection results due to fluctuation of the flow itself of the processing fluid, detection errors, or the like. From this, it is desirable not only to make a determination using an index of whether or not the above-described two density profiles coincide with each other but also to establish an index for more reliably determining the end time.

SUMMARY OF THE INVENTION

This invention is intended to solve the above-described problem. A first object of this invention is to provide a technique for properly determining an end timing of replacement in replacing a liquid to be replaced by a processing fluid in a supercritical state in a chamber. Further, a second object of this invention is to reduce a time required for a process and the consumption of the processing fluid by substrate processing using this technique.

One aspect of this invention is intended for a replacement end time determination method in a process of replacing a liquid to be replaced by a processing fluid in a supercritical state in a chamber. In this invention, by supplying and discharging the processing fluid into and from the chamber in which the liquid to be replaced is present in accordance with a predetermined supply/discharge recipe for filling an inside of the chamber with the processing fluid in the supercritical state, the processing fluid in the chamber is maintained in the supercritical state. A density of the processing fluid discharged from the chamber is detected, a difference between a detection value at each time and a value indicated by a reference density profile acquired in advance is accumulated. On the basis of an accumulated value and a predetermined threshold value, it is determined whether or not replacement of the liquid to be replaced by the processing fluid is ended.

Further, another aspect of this invention is intended for a substrate processing method, wherein a processing fluid in a chamber is maintained in a supercritical state by accommodating a substrate with a liquid to be replaced adhering thereto in the chamber and supplying and discharging the processing fluid into and from the chamber in accordance with a predetermined supply/discharge recipe for filling an inside of the chamber with the processing fluid in the supercritical state, a density of the processing fluid discharged from the chamber is detected, a difference between a detection value at each time and a value indicated by a reference density profile acquired in advance is accumulated, it is determined, on the basis of an accumulated value and a predetermined threshold value, whether or not replacement of the liquid to be replaced by the processing fluid is ended, and when it is determined that the replacement is ended, the substrate is dried by discharging the processing fluid and decompressing the inside of the chamber.

Furthermore, still another aspect of this invention is intended for a substrate processing apparatus including a chamber having an internal space capable of accommodating a substrate with a liquid to be replaced adhering thereto, a fluid supply/discharge part for supplying and discharging a processing fluid into and from the chamber, a density detector for detecting a density of the processing fluid discharged from the chamber, and a controller for controlling the fluid supply/discharge part on the basis of a detection result of the density detector. In this invention, when the controller performs the above-described replacement end time determination method and determines that the replacement is ended, the controller causes the fluid supply/discharge part to discharge the processing fluid to decompress an inside of the chamber, to thereby dry the substrate.

In these aspects of this invention, the reference density profile is obtained as a density profile representing a time change of the density, which is obtained by detecting the density of the processing fluid in the chamber while supplying and discharging the processing fluid into and from the chamber in accordance with the supply/discharge recipe in a state where the liquid to be replaced is not present in the chamber.

In the invention configured thus, a replacement end time is determined on the basis of a density change of the processing fluid at the time when the chamber is filled with the processing fluid in the supercritical state from a state (hereinafter, referred to as a "wet state") where a substrate with a liquid to be replaced adhering thereto is present in the chamber and a reference density profile acquired in a "dry state" where the liquid to be replaced is not present. Specifically, the process is as follows.

Qualitative interpretation of the phenomenon that there arises a difference between the density profile in the wet state where the liquid to be replaced is present in the chamber and that in the dry state where the liquid to be replaced is not present is as described in PTL 2. On the other hand, quantitatively, the difference depends on the quantity of the liquid to be replaced contained in the processing fluid. Specifically, when the processing fluid of which the density is detected contains a large quantity of liquid to be replaced, there is a large difference in the density between the state and the dry state.

Therefore, it can be said that the difference in the density detected at a corresponding time between the wet state and the dry state is an index representing the quantity of the liquid to be replaced contained in the processing fluid at that time. Then, when the difference of the density detected at each time is accumulated (in principle, a density difference expressed as a function of the time is integrated), it can be said that the accumulated value (integrated value) is a value indexing the total quantity of the liquid to be replaced discharged together with the processing fluid until that time.

Thus, the accumulated value of the differences in the density profile between the wet state and the dry state represents the quantity of the liquid to be replaced which is discharged. From this, this value can be used for determining the replacement end time. In a case, for example, where the quantity of the liquid to be replaced taken into the chamber is known in advance, it can be determined that the replacement is ended at the point in time when the quantity of the liquid to be replaced which is discharged reaches the quantity of the liquid to be replaced taken into the chamber. Further, for example, regardless of whether or not the quantity of the liquid taken into the chamber is known, it can be determined that the replacement is ended at the point in time when the accumulated value calculated with time does not indicate a significant increase. Practically, for example, an appropriate threshold value is set in advance for the accumulated value, and then it is possible to properly determine the replacement end time on the basis of a result of comparison between the calculated accumulated value and the threshold value.

As described above, in the present invention, it is possible to properly grasp a timing of exhausting the liquid to be replaced by determining the end timing of the replacement process on the basis of the accumulated value of the difference between the density profile of the processing fluid in the chamber from the state where the liquid to be replaced is present and the reference density profile acquired in advance. Further, by applying the determination result to the substrate processing using the processing fluid in the supercritical state, it becomes possible to reduce the processing time of the substrate processing and the consumption of the processing fluid.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Figure 1:
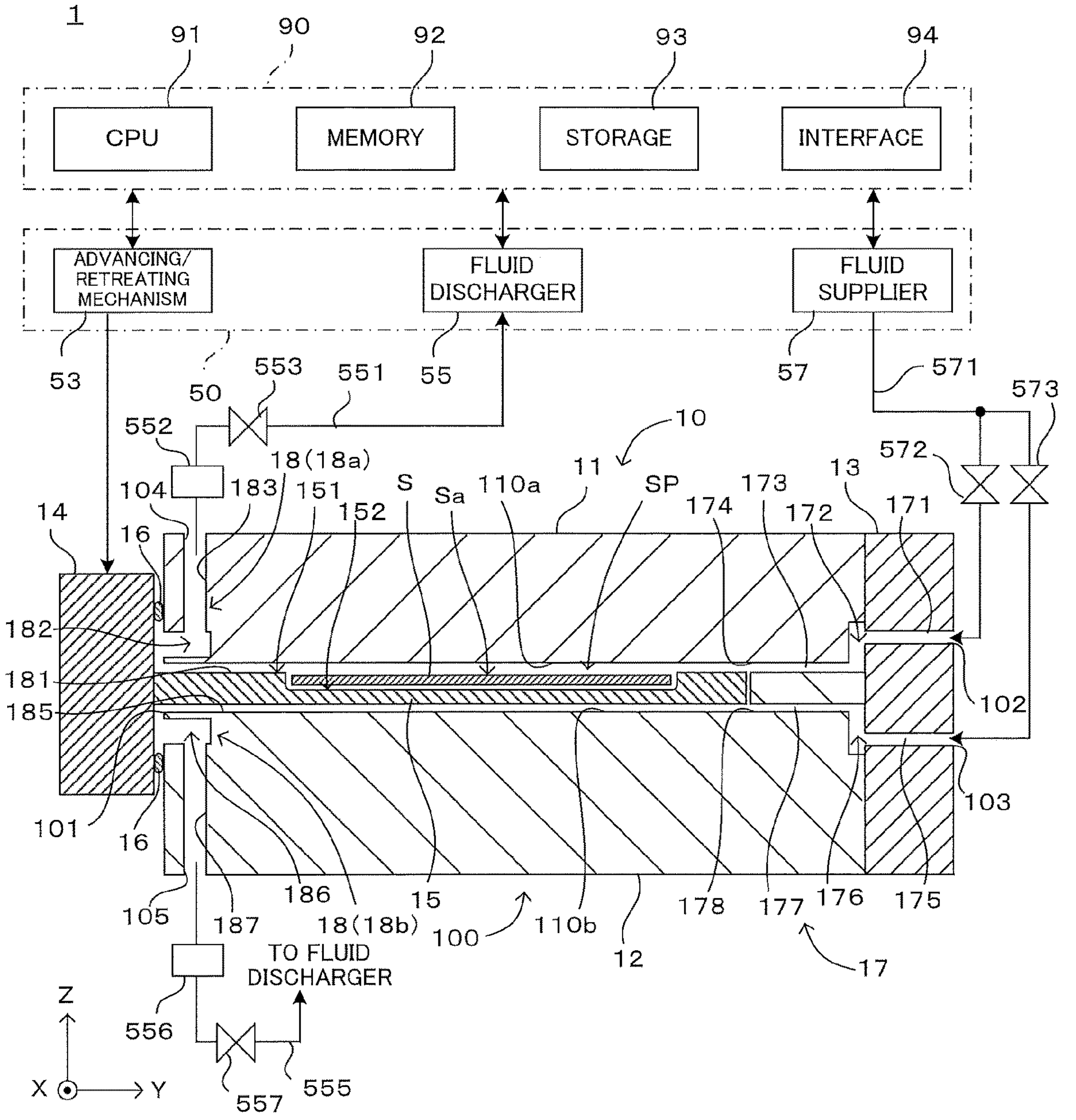
FIG. 1 is a view showing a schematic configuration of an exemplary substrate processing apparatus according to the present invention.

FIG. 1 is a view showing a schematic configuration of an exemplary substrate processing apparatus according to the present invention. This substrate processing apparatus 1 is an apparatus for processing surfaces of various substrates such as semiconductor substrates using supercritical fluids. Its device construction is preferably capable of performing a replacement end time determination method and a substrate processing method according to the present invention. To show directions in each figure in a unified manner below, an XYZ orthogonal coordinate system is set as shown in FIG. 1. Here, an XY plane represents a horizontal plane. A Z direction represents a vertical direction, and more specifically, a (−Z) direction represents a vertically downward direction.

Various substrates such as semiconductor wafers, glass substrates for photomask, glass substrates for liquid crystal display, glass substrates for plasma display, substrates for FED (Field Emission Display), substrates for optical disk, substrates for magnetic disk, and substrates for magneto-optical disk can be adopted as the "substrate" in this embodiment. A substrate processing apparatus used to process a disk-shaped semiconductor wafer is mainly described as an example with reference to the drawings. But the substrate processing apparatus can be adopted also to process various substrates illustrated above.

The substrate processing apparatus 1 includes a processing unit 10, a supply unit 50 and a control unit 90. The processing unit 10 serves as an execution subject of a supercritical drying process. The supply unit 50 supplies chemical substances and power necessary for the process to the processing unit 10.

The control unit 90 realizes a predetermined process by controlling these components of the apparatus. For this purpose, the control unit 90 includes a CPU 91, a memory 92, a storage 93, an interface 94, and the like. The CPU 91 executes various control programs. The memory 92 temporarily stores processing data. The storage 93 stores the control programs to be executed by the CPU 91. The interface 94 exchanges information with a user and an external apparatus. Operations of the apparatus to be described later are realized by the CPU 91 causing each component of the apparatus to perform a predetermined operation by executing the control program written in the storage 93 in advance.

The processing unit 10 has a processing chamber 100. The processing chamber 100 includes a first member 11, a second member 12 and a third member 13 and each of these is made of metal block. The first member 11 and the second member 12 are combined in vertical direction by an unillustrated fixing member. The third member 13 is combined from the (+Y) side of the first member 11 and the second member 12 by an unillustrated fixing member. In this way, the processing chamber 13 having a hollow inside is constructed. An internal space inside this hollow serves as a processing space SP where the processing of the substrate S is performed. A substrate S to be processed is carried into the processing space SP to be processed. A slit-like aperture 101 elongated in an X direction is formed in a (−Y) side surface of the processing chamber 100. The processing space SP communicates with an outside space via the aperture 101.

A lid member 14 is provided on the (−Y) side surface of the processing chamber 100 to close the aperture 101. A support tray 15 in the form of a flat plate is attached in a horizontal posture to a (+Y) side surface of the lid member 14. An upper surface 151 of the support tray 15 serves as a support surface on which the substrate S can be placed. More specifically, the support tray 15 has a structure that a recess portion 152 formed slightly larger than a planar size of the substrate S is provided to the approximately flat upper surface 151. The substrate S is accommodated in the recess 152 and held at a predetermined position on the support tray 15. The substrate S is held with a surface to be processed (hereinafter, it may be abbreviated as "substrate surface" or "surface") Sa facing up. At this time, it is desirable that the upper surface 151 of the support tray 15 and the substrate surface Sa form a same or approximately same plane.

The lid member 14 is supported horizontally movably in a Y direction by an unillustrated support mechanism. The lid member 14 is movable toward and away from the processing chamber 100 by an advancing/retreating mechanism 53 provided in the supply unit 50. Specifically, the advancing/retreating mechanism 53 includes a linear motion mechanism such as a linear motor, a linear guide, a ball-screw mechanism, a solenoid or an air cylinder. Such a linear motion mechanism moves the lid member 14 in the Y direction. The advancing/retreating mechanism 53 operates in response to a control command from the control unit 90.

If the support tray 15 is pulled out from the processing space SP to outside via the aperture 101 by a movement of the lid member 14 in a (−Y) direction, the support tray 15 is accessible from outside. Specifically, it becomes possible to place the substrate S on the support tray 15 and take out the substrate S placed on the support tray 15. On the other hand, the lid member 14 moves in a (+Y) direction, whereby the support tray 15 is accommodated into the processing space SP. If the substrate S is placed on the support tray 15, the substrate S is carried into the processing space SP together with the support tray 15.

In the supercritical drying processing mainly for the purpose of drying the substrate while preventing pattern collapse due to a surface tension of the liquid, the substrate S is carried in with the surface Sa covered with a liquid film to prevent the exposure of the surface Sa and the occurrence of pattern collapse. An organic solvent having a relatively low surface tension such as isopropyl alcohol (IPA) or acetone can be suitably used as the liquid for constituting the liquid film.

The lid member 14 moves in the (+Y) direction to close the aperture 101, whereby the processing space SP is sealed. A sealing member 16 is provided between the (+Y) side surface of the lid member 14 and the (−Y) side surface of the processing chamber 100 and an airtight state of the processing space SP is maintained. The seal member 16 can be made of an elastic resin material with an annular shape, a rubber material, for example. Further, the lid member 14 is fixed to the processing chamber 100 by an unillustrated lock mechanism. The substrate S is processed in the processing space SP with the airtight state of the processing space SP ensured in this way.

In this embodiment, a fluid of a substance usable for a supercritical process, e.g. carbon dioxide, is sent in a gaseous or liquid state from a fluid supplier 57 provided in the supply unit 50 as the processing fluid. Carbon dioxide is a chemical substance suitable for the supercritical drying process in having properties of entering a supercritical state at relatively low temperature and low pressure and dissolving an organic solvent often used in substrate processing well. At a critical point of carbon dioxide at which the fluid comes into the supercritical state, a pressure (critical pressure) is 7.38 MPa and a temperature (critical temperature) is 31.1° C.

More specifically, the fluid supplier 57 outputs a processing fluid for processing the substrate S that is a fluid in a supercritical state or a fluid supplied in a gas form or in a liquid form and to be brought to a supercritical state thereafter by being supplied with a predetermined temperature and a predetermined pressure. For example, carbon dioxide is output in a compressed state in a gas form or in a liquid form. The fluid is fed under pressure to an input port 102 and an input port 103 provided at a side surface of the processing chamber 100 on the (+Y) side through a pipe 571, and a valve 572 and a valve 573 interposed in the pipe 571. Specifically, by opening the valves 572 and 573 in response to a control command from the control unit 90, the fluid is fed from the fluid supplier 57 to the processing chamber 100.

A flow path 17 of the fluid from the input ports 102 and 103 to the processing space SP functions as an introduction flow path for introducing the processing fluid supplied from the fluid supplier 57 into the processing space SP. More specifically, a flow path 171 is connected to the input port 102. The flow path 171 has an end on the opposite side to the input port 102 where buffer space 172 is provided having a flow path sectional area increased steeply.

A flow path 173 is provided further in such a manner as to connect the buffer space 172 and the processing space SP to each other. The flow path 173 has a broad sectional shape narrow in the vertical direction (Z direction) and extending long in a horizontal direction (X direction). This sectional shape is substantially constant in a flow direction of the processing fluid. The flow path 173 has an end on the opposite side to the buffer space 172 that functions as an ejection port 174 having an opening bordering the processing space SP. The processing fluid is introduced through the ejection port 174 into the processing space SP.

Desirably, the height of the flow path 173 is equal to a distance between a ceiling surface 110*a* of the processing space SP and the upper surface Sa of the substrate S with the support tray 15 housed in the processing space SP. The ejection port 174 is opened while bordering a gap between the ceiling surface 110*a* of the processing space SP and the upper surface 151 of the support tray 15. For example, a ceiling surface of the flow path 173 and the ceiling surface 110*a* of the processing space SP may form the same plane. In this way, the ejection port 174 is opened into a slit shape elongated in the horizontal direction while bordering the processing space SP.

A flow path of the processing fluid is formed under the support tray 15 in the same way. More specifically, a flow path 175 is connected to the input port 103. The flow path 175 has an end on the opposite side to the input port 103 where buffer space 176 is provided having a flow path sectional area increased steeply.

The buffer space 176 and the processing space SP communicate with each other through a flow path 177. The flow path 177 has a broad sectional shape narrow in the vertical direction (Z direction) and extending long in the horizontal direction (X direction). This sectional shape is substantially constant in the flow direction of the processing fluid. The flow path 177 has an end on the opposite side to the buffer space 176 that functions as an ejection port 178 having an opening bordering the processing space SP. The processing fluid is introduced through the ejection port 178 into the processing space SP.

Desirably, the height of the flow path 177 is substantially equal to a distance between a bottom surface 110*b* of the processing space SP and a lower surface of the support tray 15. The ejection port 178 is opened while bordering a gap between the bottom surface 110*b* of the processing space SP and the lower surface of the support tray 15. For example, a bottom surface of the flow path 177 and the bottom surface 110*b* of the processing space SP may form the same plane. That is, the ejection port 178 is opened into a slit shape elongated in the horizontal direction while bordering the processing space SP.

Desirably, the flow path 171 and the flow path 173 are arranged at positions differing from each other in the Z direction. If the flow paths 171 and 173 are at the same height, part of the processing fluid having flowed from the flow path 171 into the buffer space 172 travels straight directly into the flow path 173. This causes a risk that the flow rate or flow speed of the processing fluid flowing into the flow path 173 will differ between a position corresponding to the flow path 171 and a position not corresponding to the flow path 171 in a width direction of the flow path perpendicular to the flow direction, namely, in the X direction. This causes non-uniformity in the flow of the processing fluid in the X direction flowing from the flow path 173 into the processing space SP to become a cause for a disturbed flow.

Arranging the flow path 171 and the flow path 173 at different positions in the Z direction prevents the occurrence of such straight travel of the processing fluid from the flow path 171 to the flow path 173. As a result, it becomes possible to introduce the processing fluid in a laminar flow uniform in the width direction into the processing space SP. Same concept can be also applied to a positional relation between the flow path 175 and the flow path 177.

The processing fluid introduced through the introduction flow path 17 having the foregoing configuration flows along the upper surface and the lower surface of the support tray 15 in the processing space SP and is discharged to the outside of the processing chamber through a discharge flow path 18 having a configuration described next. Both the ceiling surface 110*a* of the processing space SP and the upper surface 151 of the support tray 15 form horizontal planes on the (−Y) side relative to the substrate S while extending parallel to each other in facing positions with a constant gap maintained therebetween. This gap functions as an upstream path 181 of an upper part of the discharge flow path 18 for guiding the processing fluid having flowed along the upper surface 151 of the support tray 15 and the upper surface Sa of the substrate S to the fluid discharger 55. The upstream path 181 has a broad sectional shape narrow in the vertical direction (Z direction) and extending long in the horizontal direction (X direction).

The upstream path 181 has an end on the opposite side to the processing space SP that is connected to buffer space 182. The buffer space 182 is space surrounded by the processing chamber 100, the lid member 14, and the seal member 16. The buffer space 182 has a width in the X direction that is substantially equal to or greater than the corresponding width of the upstream path 181, and a height in the Z direction that is greater than the corresponding height of the upstream path 181. Thus, the buffer space 182 has a larger flow path sectional area than the upstream path 181.

A downstream path 183 of the upper part of the discharge flow path 18 is connected to the top of the buffer space 182. The downstream path 183 is a through hole penetrating the first member 11 as an upper block forming the chamber 100. The downstream path 183 has an upper end that forms an output port 104 opened at an upper surface of the chamber 100, and a lower end that has an opening bordering the buffer space 182.

Likewise, both the bottom surface of the processing space SP and the lower surface of the support tray 15 form horizontal planes while extending parallel to each other in facing positions with a constant gap maintained therebetween. This gap functions as an upstream path 185 of a lower part of the discharge flow path 18 for guiding the processing fluid having flowed along the lower surface of the support tray 15 to the fluid discharger 55. The upstream path 185 at the lower side of the support tray 15 is, as the upper side of the support tray 15, connected to a downstream path 187 of the lower part of the discharge flow path via a buffer space 186.

The processing fluid flowing above the support tray 15 in the processing space SP is sent to the output port 104 through the upstream path 181, the buffer space 182, and the downstream path 183 constituting the upper part of the discharge flow path 18. The output port 104 is connected to a fluid discharger 55 by a pipe 551, and a density detector 552 and a valve 553 are interposed in the pipe 551.

Similarly, the processing fluid flowing below the support tray 15 in the processing space SP is sent to the output port 105 through the upstream path 185, the buffer space 186, and the downstream path 187 constituting the lower part of the discharge flow path 18. The output port 105 is connected to the fluid discharger 55 by a pipe 555, and a density detector 556 and a valve 557 are interposed in the pipe 555.

The valves 553 and 557 are controlled by the control unit 90. When the valves 553 and 557 are opened in response to the control command from the control unit 90, the processing fluid in the processing space SP is collected into the fluid discharger 55 through the pipes 551 and 555.

Thus, in this substrate processing apparatus 1, the upstream path 181, the buffer space 182, and the downstream path 183 integrally with the pipe 551 in the discharge flow path 18 constitute an "upper discharge flow path 18*a*" which serves to discharge the processing fluid passing through on an upper surface side of the substrate S in the processing space SP. Further, the upstream path 185, the buffer space 186, and the downstream path 187 integrally with the pipe 555 in the discharge flow path 18 constitute a "lower discharge flow path 18*b*" which serves to discharge the processing fluid passing through on the lower surface side of the support tray 15 in the processing space SP.

Then, the upper discharge flow path 18*a* and the lower discharge flow path 18*b* are provided with the density detectors 552 and 556 for detecting the density of the fluid, respectively. As the density detectors 552 and 556, devices based on various principles that make it possible to detect the density of the fluid on the flow path can be applied. For example, a mass flow meter, more specifically, for example, a Coriolis flow meter can be used. In order to reduce detection errors due to pressure loss on the path, it is desirable to provide the density detectors 552 and 556 as upstream as possible on the discharge flow path.

Figure 2:
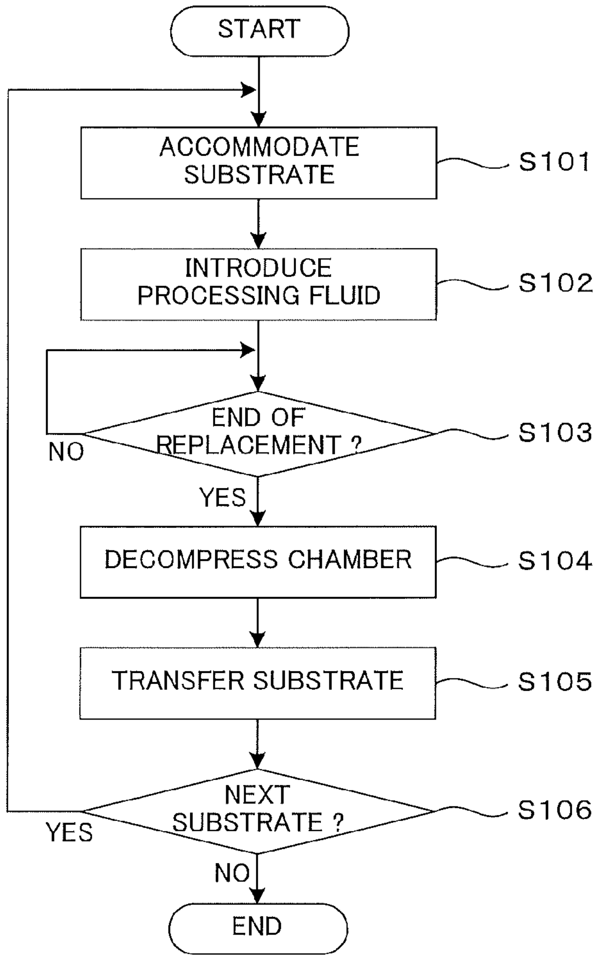
FIG. 2 is a flow chart showing an overview of a process performed by this substrate processing apparatus.

FIG. 2 is a flow chart showing an overview of a process performed by this substrate processing apparatus. This substrate processing apparatus 1 performs a supercritical drying process, i.e. a process of drying the substrate S which is cleaned with a cleaning liquid in a previous process using a supercritical processing fluid. Specifically, this process is as follows. The substrate S to be processed is cleaned with the cleaning liquid in the previous process performed in another substrate processing apparatus constituting a substrate processing system. Thereafter, the substrate S is conveyed to the substrate processing apparatus 1 with a liquid film by an organic solvent such as isopropyl alcohol (IPA) formed on a surface.

For example, if a fine pattern is formed on the surface of the substrate S, the pattern may collapse due to surface tension of the liquid remaining on and adhering to the substrate S. Further, watermarks may remain on the surface of the substrate S due to incomplete drying. Further, the surface of the substrate S may be altered such as through oxidation by being exposed to outside air. To prevent such problems, the substrate S may be conveyed with the surface (pattern forming surface) of the substrate S covered by a liquid or solid surface layer.

For example, if the cleaning liquid contains water as a main component, conveyance is carried out with the liquid film formed by a liquid having a lower surface tension than the cleaning liquid and low corrosiveness to the substrate, e.g. an organic solvent such as IPA or acetone. That is, the substrate S is conveyed to the substrate processing apparatus 1 while being supported in a horizontal state and having the liquid film formed on the upper surface thereof.

The substrate S conveyed by the unillustrated conveying device is accommodated into the processing chamber 100 (Step S101). Specifically, the substrate S is conveyed with the pattern forming surface serving as the upper surface and the upper surface covered by a thin liquid film. The substrate S is transferred to the support tray 15 via unillustrated lift pins. That is, with the lid member 14 moved to the (−Y) side and the support tray 15 pulled out, the lift pins move up above the upper surface 151 of the support tray 15 via unillustrated through holes provided to the support tray 15. The conveying device transfers the substrate S to the lift pins. The lift pins move down, whereby the substrate S is placed on the support tray 15. The support tray 15 and the lid member 14 integrally move in the (+Y) direction. By doing so, the support tray 15 supporting the substrate S is accommodated into the processing space SP in the processing chamber 100 and the opening 101 is closed by the lid member 14.

In this state, carbon dioxide serving the processing fluid is introduced in a gas phase state into the processing space SP (Step S102). Outside air enters the processing space SP when the substrate S is carried in, but it can be replaced by introducing the processing fluid in the gas phase. Further, by injecting the processing fluid in the gas phase, a pressure in the processing chamber 100 increases.

Note that, in the process of introducing the processing fluid, the processing fluid is continually discharged from the processing space SP by the fluid discharger 55 also while the processing fluid is being introduced by the fluid supplier 57. In this way, the processing fluid used for the process is discharged without stagnation in the processing space SP, thereby preventing impurities such as the remaining liquid taken into the processing fluid from adhering to the substrate S again.

If the supply amount of the processing fluid is more than the discharge amount, the density of the processing fluid in the processing space SP increases and the chamber internal pressure increases. Conversely, if the supply amount of the processing fluid is less than the discharge amount, the density of the processing fluid in the processing space SP decreases and the inside of the chamber is decompressed. The supply of the processing fluid into the processing chamber 100 and the discharge thereof from the processing chamber 100 are performed based on a supply/discharge recipe prepared in advance. That is, the control unit 90 controls the fluid supplier 57 and the fluid discharger 55 based on the supply/discharge recipe, whereby supply and discharge timings, flow rates and the like of the processing fluid are adjusted.

If the pressure of the processing fluid in the processing space SP increases and exceeds a critical pressure, the processing fluid enters a supercritical state in the chamber. That is, due to a phase change in the processing space SP, the processing fluid transitions from the gas phase to the supercritical state. Note that the processing fluid in the supercritical state may be supplied from outside. By introducing the supercritical fluid into the processing space SP, the organic solvent such as IPA covering the substrate S is replaced by the supercritical fluid. The organic solvent isolated from the surface of the substrate S is discharged from the processing chamber 100 together with the processing fluid while being dissolved in the processing fluid, and removed from the substrate S. That is, the processing fluid in the supercritical state has a function of replacing the organic solvent adhering to the substrate S as a liquid to be replaced and discharging the organic solvent to the outside of the processing chamber 100.

When the replacement of the liquid to be replaced by the supercritical fluid is finished in the processing chamber 100 (Step S103), the substrate S is dried by discharging the processing fluid in the processing space SP. Specifically, the inside of the processing chamber 100 filled with the processing fluid in the supercritical state is decompressed by increasing a discharge amount of the fluid from the processing space SP (Step S104). At this time, the supply of the processing fluid may be stopped or a small amount of the processing fluid may continue to be supplied. By decompressing the processing space SP from the state filled with the supercritical fluid, the processing fluid undergoes a phase change from the supercritical state to the gas phase. By discharging the vaporized processing fluid to outside, the substrate S is dried. At this time, a decompression speed is regulated so as not to create a solid phase and a liquid phase due to a sudden temperature drop. In this way, the processing fluid in the processing space SP is directly vaporized from the supercritical state and discharged to outside. Therefore, the formation of a gas-liquid interface on the substrate S having the exposed surface after drying is avoided.

As just described, in the supercritical drying process of this embodiment, the liquid adhering to the substrate S can be efficiently replaced and prevented from remaining on the substrate S by changing the phase of the processing fluid to the gas phase and discharging the processing fluid after the processing space SP is filled with the processing fluid in the supercritical state. By doing so, it is possible to replace the liquid adhering the substrate S effectively and prevent the liquid remaining on the substrate S. Moreover, the substrate can be dried while avoiding problems caused due to the formation of the gas-liquid interface such as the contamination of the substrate by adhering impurities and pattern collapse.

The processed substrate S is delivered to a subsequent process. That is, the lid member 14 moves in the (−Y) direction, whereby the support tray 15 is pulled out to outside from the processing chamber 100 and the substrate S is transferred to the external conveying device (Step S105). At this time, the substrate S is in the dried state. The content of the subsequent process is arbitrary. Unless there is a substrate to be processed next (NO in Step S106), the process is finished. If there is another substrate to be processed (YES in Step S106), return is made to Step S101, the substrate S is newly received and the above process is repeated.

If the next substrate S is successively processed after the process for one substrate S is finished, a tact time can be shortened as follows. That is, after the support tray 15 is pulled out and the processed substrate S is carried out, the support tray 15 is accommodated into the processing chamber 100 after a new unprocessed substrate S is placed thereon. Further, by reducing the number of opening and closing the lid member 14 in this way, an effect of suppressing a temperature change in the processing chamber 100 due to the entrance of outside air is also obtained.

Next, a method for determining at which point of time the replacement of the liquid to be replaced by the supercritical fluid is regarded to be finished (Step S103) is described. As described above, after the replacement of the liquid to be replaced by the supercritical fluid is finished, the substrate is dried by decompressing the inside of the chamber and evaporating the processing fluid. Here, if the processing fluid is evaporated with the liquid to be replaced remaining in the processing space SP, the liquid to be replaced may adhere to the substrate S again to cause a drying failure. To avoid this, the evaporation of the processing fluid needs to occur in a state where the replacement by the processing fluid is finished, i.e. in a state where the liquid to be replaced is completely discharged from the processing space SP.

For that purpose, it is necessary to properly grasp an end timing of the replacement process in the chamber. The present applicant precedently proposed a technique for determining whether or not the replacement has been ended in the processing chamber 100 under a high pressure, i.e., whether or not the liquid to be replaced has been completely discharged (see PTL 2). This technique uses the fact that the density of the processing fluid differs depending on whether or not the processing fluid contains any other liquid. That is, by paying attention to the difference between the time change of the density (density profile) of the processing fluid discharged from the processing space SP and the density profile at the time when the processing fluid is introduced in a state where the liquid to be replaced is not present in the processing space SP, which is acquired in advance, the replacement end time is determined.

Though the following description partially overlaps the description of PTL 2, the density change of the fluid in the processing space SP in the supercritical drying process and the technique for determining the replacement end time by using the density change will be described.

Figure 3:
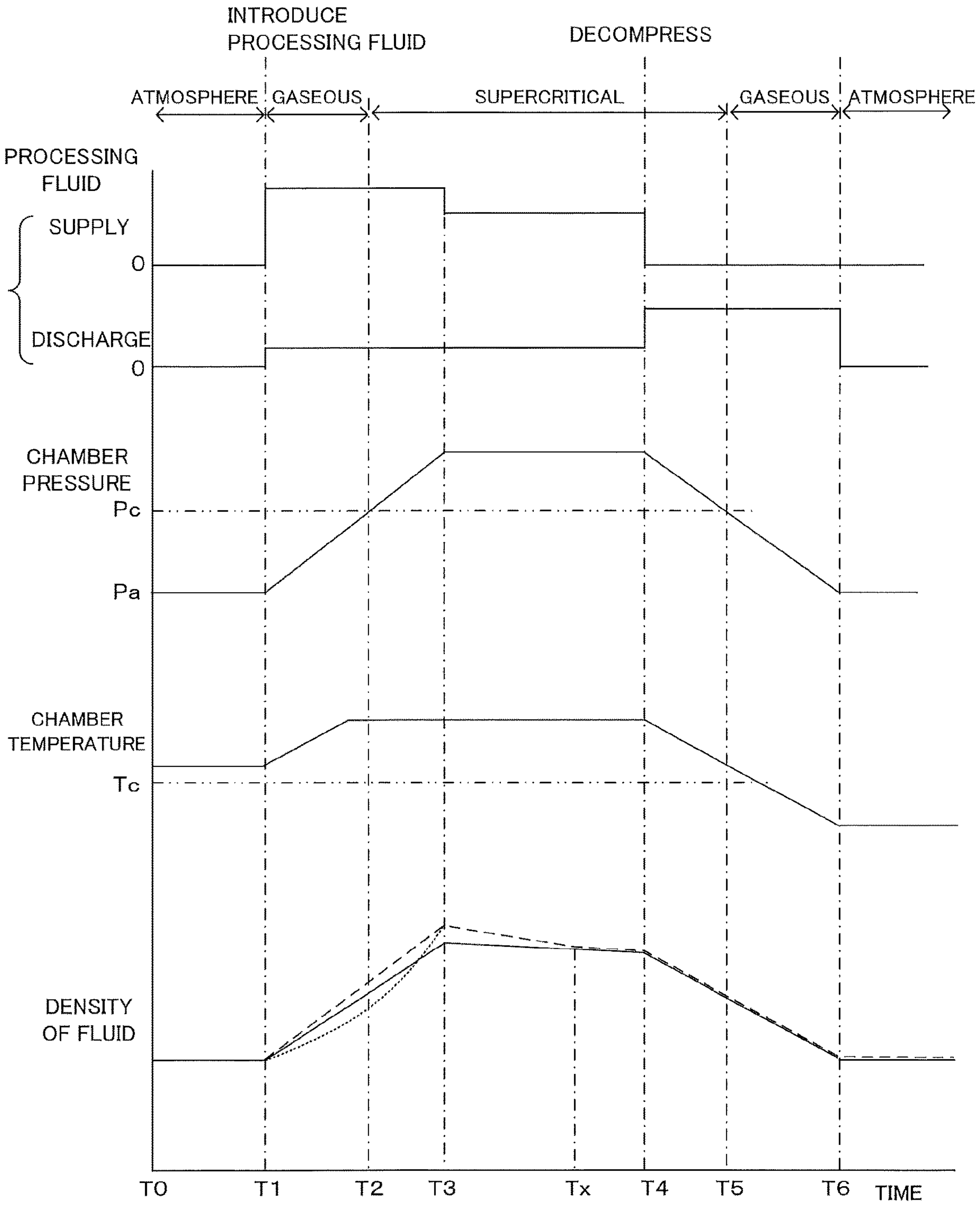
FIG. 3 is a timing chart showing a state change of each part in a supercritical process.

FIG. 3 is a timing chart showing a state change of each part in the supercritical process. More specifically, FIG. 3 is a chart showing a relationship between supply and discharge timings of the processing fluid based on the supply/discharge recipe and state changes in the processing chamber 100 associated with these timings. First, the supply/discharge recipe specifying the supply and discharge timings of the processing fluid and the amounts of the processing fluid is described.

In an initial state (time T0), the lid member 14 is opened to accommodate the substrate S into the processing chamber 100 and the processing space SP is open to an atmosphere. That is, the chamber internal pressure is almost an atmospheric pressure Pa and sufficiently smaller than the critical pressure Pc. On the other hand, since a critical temperature Tc of carbon dioxide serving as the processing fluid is close to a room temperature, a chamber internal temperature is close to the critical temperature Tc. Although the chamber internal temperature is slightly higher than the critical temperature Tc in FIG. 3, the chamber internal temperature is possibly lower than the critical temperature Tc in some cases.

After the substrate S is accommodated, the processing fluid in the gas phase starts to be introduced into the processing space SP at time T1. At this time, the processing fluid is also discharged at a certain rate. By setting a supply flow rate larger than a discharge flow rate, the chamber internal pressure gradually increases. If the chamber internal temperature is higher than the critical temperature Tc at time T2 at which the chamber internal pressure reaches the critical pressure Pc, the processing fluid undergoes a phase transition to the supercritical state.

At time T3, the supply amount of the processing fluid is adjusted to an amount for maintaining the chamber internal pressure substantially constant and, thereafter, the chamber internal pressure is kept substantially constant. At time T4, decompression is started. That is, while the supply amount of the processing fluid is largely reduced, the discharge amount is largely increased. In this way, the processing fluid is excessively discharged and the chamber internal pressure is suddenly reduced. The chamber internal temperature is also reduced according to sudden expansion of the processing fluid.

At time T5 at which the chamber internal pressure falls below the critical pressure Pc or the chamber internal temperature falls below the critical temperature Tc, the processing fluid undergoes a phase transition to the gas phase. At and after time T6 at which the chamber internal pressure is reduced substantially to the atmospheric pressure Pa, the processing space SP can be opened to the atmosphere and the substrate S can be carried out. A decompression rate is so set that the processing fluid in the critical state transitions to the gas phase without via a liquid phase.

The inventor of this application observed a density change of a fluid in a chamber in such a series of processes and acquired the following knowledge. An example of an observed density change is shown in a lower part of FIG. 3. The density change in a state where the liquid to be replaced is not present in the chamber in the initial state is shown by a solid line. The density of the fluid in the chamber can be said to depend on the temperature and pressure in the chamber and transition, substantially following a pressure change if a temperature change is small.

On the other hand, if the processing fluid is similarly supplied and discharged in a state where the liquid to be replaced is present in the chamber in advance, the density becomes higher than in the state where the liquid to be replaced is not present as shown by a broken line and a dotted line in FIG. 3 and, thereafter, a density difference gradually decreases and transitions substantially in the same manner as in the state where the liquid to be replaced is not present at and after time Tx. There is possibly a case where the density is high from the beginning as shown by the broken line and a case where the density increase is delayed as shown by the dotted line. However, in either case, a higher density than in the state where the liquid to be replaced is not present is finally reached. This is thought to be because, by dissolving the liquid to be replaced in the processing fluid in the supercritical state, the density of the processing fluid in the supercritical state becomes higher than that of the processing fluid not containing the liquid to be replaced at the same pressure and temperature.

By continuing the supply and discharge of the processing fluid, a concentration of the liquid to be replaced in the chamber is gradually reduced and the remaining amount of the liquid to be replaced finally becomes zero. The aforementioned reduction in the density difference with time and the transition of the density change where the density difference diminishes at and after the time Tx can be thought to correspond to this situation.

It is thought to measure density profiles representing a change of the density of the fluid in the chamber with time as described above in each of the state where the liquid to be replaced is present in the processing space SP and the state where the liquid to be replaced is not present and to compare those. By doing so, a timing at which the liquid to be replaced is completely removed from the inside of the processing space SP, i.e. the replacement by the processing fluid is finished, can be grasped. A replacement end time determination method based on this principle will be described below.

Figure 4:
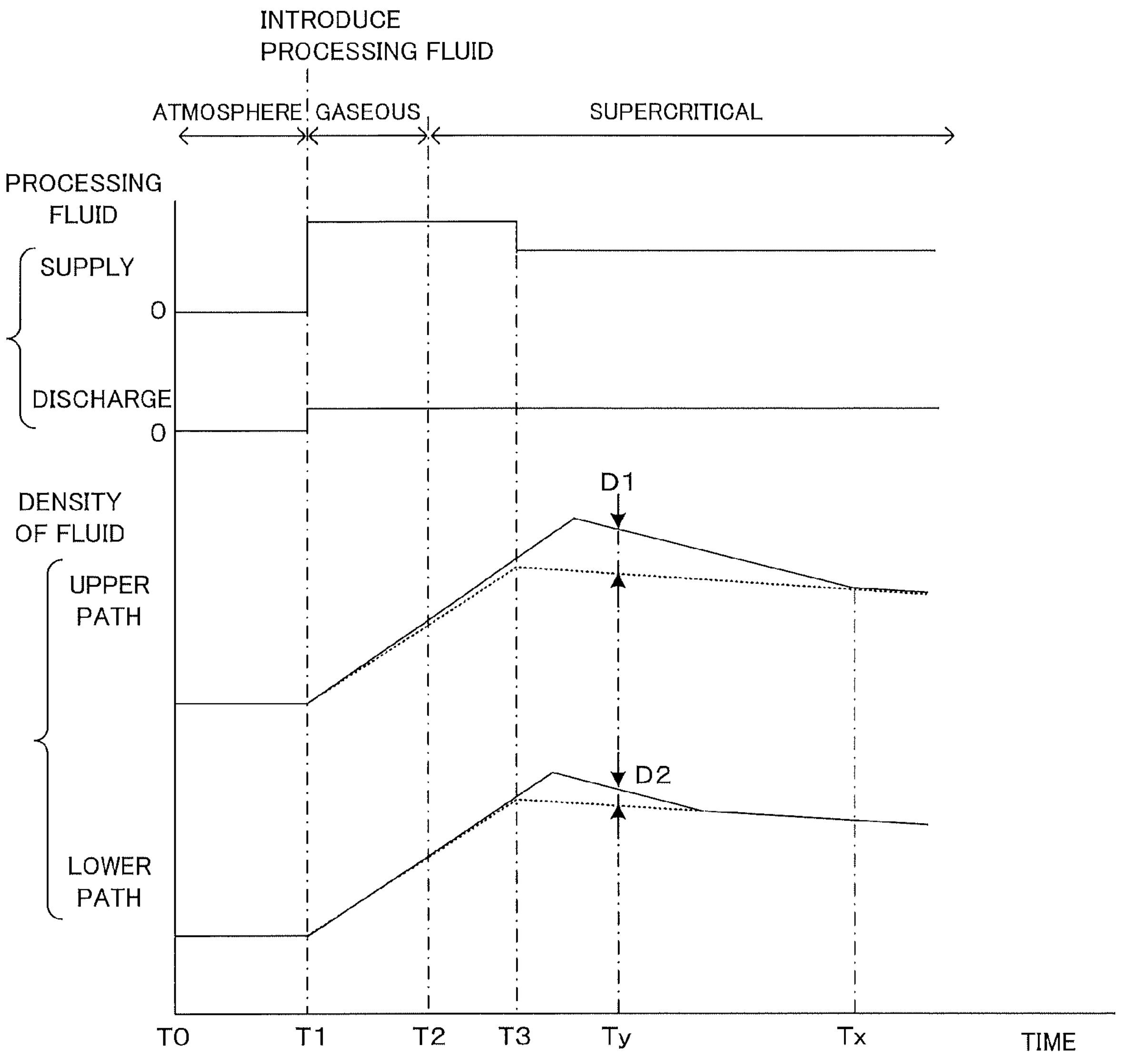
FIG. 4 is a timing chart used for explaining a principle of a replacement end time determination process in the present embodiment.

FIG. 4 is a timing chart used for explaining a principle of the replacement end time determination process in the present embodiment, and this corresponds to an enlargement of part of FIG. 3. Specifically, FIG. 4 shows a supply/discharge state of the processing fluid and a density change of the fluid during a period from the time T0 to a time after the time T4 in FIG. 3. Further, in FIG. 4, the density profile of the processing fluid acquired in the dry state where the liquid to be replaced is not present is represented by a dotted line and that acquired in the wet state where the liquid to be replaced is present is represented by a solid line.

The discharge of the processing fluid from the processing space SP continues while the processing fluid is introduced into the processing space SP in accordance with the supply/discharge recipe and gets into the supercritical state. In FIG. 3, the density change of the fluid is represented by a single curve. Actually, however, the processing fluid is discharged separately through the upper discharge flow path 18*a* passing above the substrate S and through the lower discharge flow path 18*b* passing below the support tray 15. The processing fluid flowing in the upper discharge flow path 18*a* and that flowing in the lower discharge flow path 18*b* do not necessarily have the same quantity of the liquid to be replaced contained therein. For this reason, as shown in FIG. 4, the density of the processing fluid is changed independently of each other between the upper discharge flow path 18*a* (referred to simply as an "upper path" in FIG. 4) and the lower discharge flow path 18*b* (referred to simply as a "lower path" in FIG. 4).

In general, it is thought that the processing fluid passing above the substrate S which is loaded, with a liquid film formed on an upper surface Sa thereof, contains a relatively large quantity of the liquid to be replaced. On the other hand, the processing fluid passing below the support tray 15 contains the quantity of the liquid to be replaced, which is smaller than that on the upper side, since only the liquid to be replaced going around from the substrate upper surface Sa is contained for some reason.

It can be thought that the density difference between the wet state and the dry state at any time represents the quantity of the liquid to be replaced contained in the processing fluid passing through the density detector at that time. In the upper discharge flow path 18*a*, for example, a density difference D1 between the wet state and the dry state at time Ty indicates the quantity of the liquid to be replaced in the processing fluid at that time. Therefore, when the density difference D1 calculated at each time is accumulated, an accumulated value S1 becomes a value indicating the total quantity of the liquids to be replaced which are contained in the processing fluids having been passing until then. This is equivalent to obtaining the area of a region surrounded by the density profile in the wet state and that in the dry state.

Similarly, also in the lower discharge flow path 18*b*, a density difference D2 between the wet state and the dry state at the time Ty indicates the quantity of the liquid to be replaced in the processing fluid at that time. From this, when the density difference D2 at each time is accumulated, a value S2 indicating the total quantity of the liquids to be replaced in the processing fluids having been flowing in the lower discharge flow path 18*b* can be obtained.

When the accumulated value S1 of the density difference D1 in the upper discharge flow path and the accumulated value S2 of the density difference D2 in the lower discharge flow path are added to each other, the total value (S1+S2) becomes a value indicating the total quantity of the liquid to be replaced discharged from the processing space SP. This value can be used for determining the replacement end time.

In a case, for example, where the quantity of the liquid to be replaced taken into the processing space SP as the liquid film is known in advance, it can be determined that the replacement is ended at the point in time when the total of the accumulated values indicating the quantity of discharged liquids reaches a value that corresponds to the liquid quantity taken in the processing space SP. Further, for example, since the total value (S1+S2) continues to increase while the liquid to be replaced is contained in the discharged processing fluid and the increase is stopped when the liquid to be replaced is not contained, it can be determined that the replacement is ended at the point in time when the increase is substantially stopped. The latter method can be established even when the original liquid quantity is not already known.

In the determination method described in PTL 2, it is determined that the replacement is ended when the density profile acquired in the wet state during the processing on the substrate S coincides with the density profile acquired in advance in the dry state. In this case, there may occur a case where both the profiles coincide with each other at an improper timing (i.e., a timing different from the proper end timing) or another case where conversely, a state where both the profiles do not coincide with each other continues even after the replacement is ended, due to a variation of the density change itself of the processing fluid for each processing, the detection error, or the like.

In the determination process of the present embodiment based on the above-described principle, with the difference in the density profile used as a quantitative index, the total quantity of the liquids to be replaced, which have been discharged, is estimated by accumulating this difference and the replacement end time determination is performed on the basis of the result. For this reason, it becomes possible to perform more accurate and stable determination.

Figure 5:
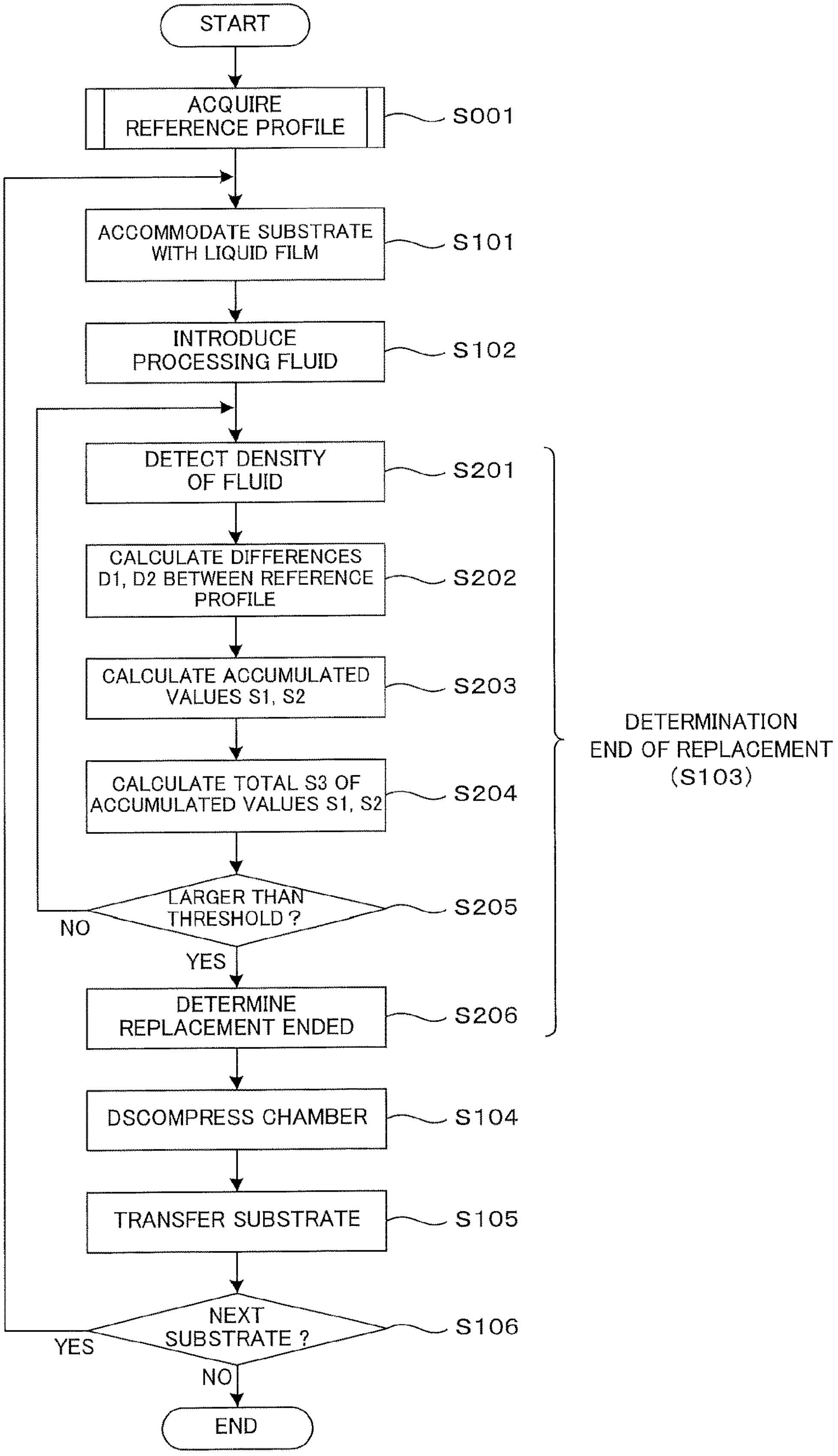
FIG. 5 is a flow chart showing an overview of a supercritical drying process including the replacement end time determination process.

FIG. 5 is a flow chart showing an overview of the supercritical drying process including the replacement end time determination process. In more detail, FIG. 5 corresponds to a rewritten version of the flow chart in FIG. 2 in which the details of the replacement end time determination process (Step S103) are shown more specifically. Then, the process steps identical to those described in the flow chart of FIG. 2 are represented by the same step numbers and description thereof will be omitted, and newly-added process steps will be described.

Prior to the supercritical drying process on the substrate S, a process of acquiring the reference profile is performed (Step S001). The reference profile serves as a reference in the comparison with the density change detected during the processing on the substrate S and corresponds to the density profile (represented by the dotted line in FIG. 4) in the above-described dry state.

Figure 6:
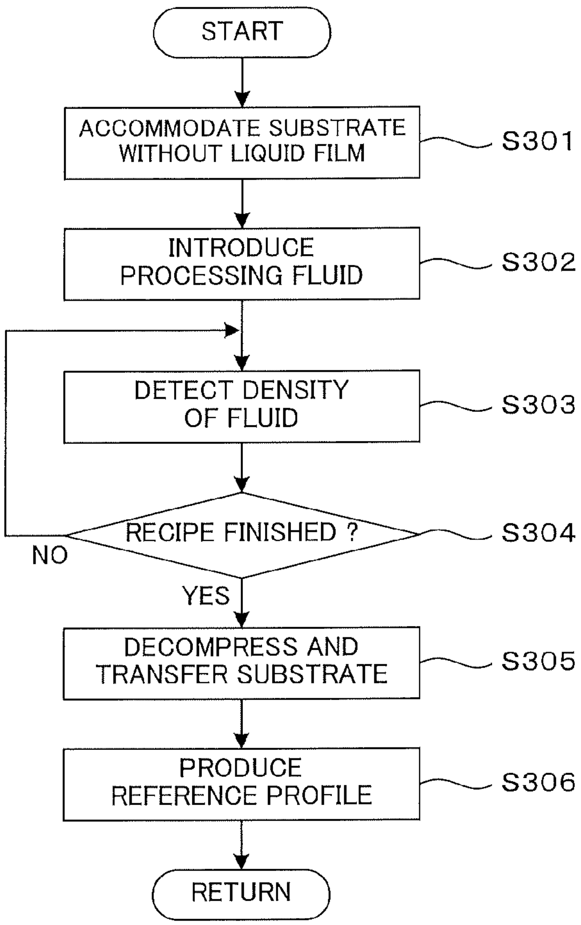
FIG. 6 is a flow chart showing an acquisition process of a reference profile.

FIG. 6 is a flow chart showing an acquisition process of the reference profile. The reference profile is acquired as follows. First, a substrate with no liquid film supported on an upper surface thereof and no liquid to be replaced adhering thereto is accommodated into the processing space SP (Step S301). The substrate at that time does not need to be the substrate S which is actually used in the subsequent supercritical drying process. For example, a dummy substrate having the same size and the same material as the substrate S to be processed may be used. More preferably, a substrate on which the same pattern as that on the substrate S to be processed is formed may be used as the dummy substrate.

From this state, introduction of the processing fluid into the processing space SP is started on the basis of the same supply/discharge recipe as that used in the supercritical drying process (Step S302). Then, the density of the processing fluid discharged from the processing space SP is continuously detected by the density detectors 552 and 556 for a period until the recipe is finished (Steps S303 and S304). The detection result is stored into the memory 92 or the storage 93. After that, the inside of the processing chamber 100 is decompressed and the substrate is unloaded therefrom (Step S305). From the detected density at each time, the density profile representing the change over time is produced to be used as the reference profile (Step S306). An averaging process through a plurality of measurements, a smoothing process for noise removal, or the like may be performed as necessary.

The reference profile is obtained individually for each of the upper discharge flow path 18*a* and the lower discharge flow path 18*b*. Specifically, the reference profile of the upper discharge flow path 18*a* based on the detection result of the density detector 552 provided in the upper discharge flow path 18*a* and the reference profile of the lower discharge flow path 18*b* based on the detection result of the density detector 556 provided in the lower discharge flow path 18*b* are each produced. The produced reference profiles are stored into the storage 93 and read out therefrom when required in the subsequent processing.

With reference back to FIG. 5, details of the supercritical drying process (Steps S102 to S106) are basically the same as described earlier. The replacement end time determination shown as the single process Step S103 in FIG. 3, however, is divided into a plurality of process Steps S201 to S206.

While the processing fluid is introduced into the processing space SP in which the substrate S is accommodated, density detection is continuously performed by the density detectors 552 and 556 (Step S201). By using a detection value at each time, the difference between the reference profile and a density value at the corresponding time is obtained and accumulated (Steps S202 and S203).

At that time, as the density detection result in the upper discharge flow path 18*a*, which is detected by the density detector 552, a difference D1 from the reference profile obtained on the upper discharge flow path 18*a* is obtained and an accumulated value S1 is further obtained. Furthermore, as the density detection result in the lower discharge flow path 18*b*, which is detected by the density detector 556, a difference D2 from the reference profile obtained on the lower discharge flow path 18*b* is obtained and an accumulated value S2 is further obtained.

A total value (total accumulated value) S3 (=S1+S2) is obtained by finally adding these accumulated values S1 and S2 to each other (Step S204). Therefore, in this embodiment, even if the differences D1 and D2 are added to each other and accumulated, to thereby obtain the total accumulated value S3, this has an equivalent technical meaning. Further, another method having an equivalent mathematical meaning, such as a method in which the difference between the accumulated value of the density detection value until that time and the accumulated value of the reference profile is regarded as the total accumulated value S3, can be applied.

The total value S3 is compared with a threshold value prepared in advance (Step S205). As described above, in principle, the total value S3 can be a value that corresponds to the total quantity of the liquid to be replaced taken into the processing space SP or the point in time when the increase over time is stopped can be the replacement end time. Since there is a case where these conditions are not completely satisfied due to the detection error or the variation, however, a method can be adopted, in which it is determined that the replacement is ended when the total value S3 reaches a predetermined threshold value.

Figure 7:
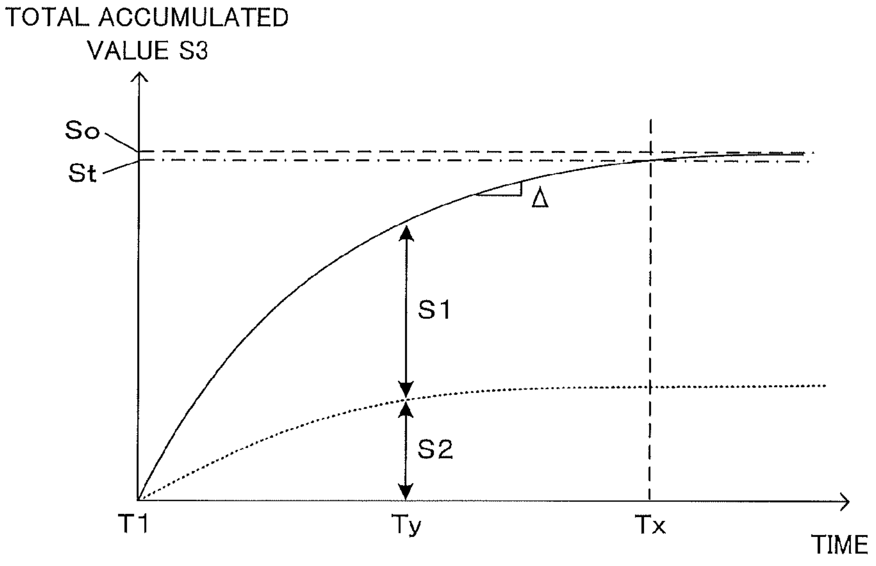
FIG. 7 is a graph showing a relation between a total accumulated value and a threshold value.

FIG. 7 is a graph showing a relation between the total accumulated value and the threshold value. The total value (total accumulated value) S3 of the accumulated value S1 obtained on the upper discharge flow path 18*a* and the accumulated value S2 obtained on the lower discharge flow path 18*b* increases with time and finally reaches a value So that corresponds to the total quantity of the liquid to be replaced which is taken into the processing space SP. There is a case, however, where total value S3 is not always the value So due to the detection error and the variation. Then, for example, a threshold value St that is sufficiently close to the value Sa that corresponds to the total quantity of the liquid to be replaced is set in advance, and the time when the total accumulated value S3 becomes not less than the threshold value St can be regarded as the time Tx when the replacement is ended (Steps S205 and S206).

Under the condition that a liquid film having a predetermined thickness is formed on the substrate S having a predetermined size, the quantity of the liquid to be replaced taken into the processing space SP can be estimated from these numerical values. In a case where a preprocess is performed by a wet processing apparatus for performing wet processing on the substrate S, it is possible to control the thickness of the liquid film formed on the substrate with high accuracy and therefore possible to grasp in advance the quantity of the liquid to be replaced that forms the liquid film. By setting the threshold value St in accordance with this liquid quantity, it becomes possible to properly determine the replacement end time.

Further, after the liquid to be replaced is completely replaced, since the liquid to be replaced is not contained in the processing fluid to be discharged, no increase of the total accumulated value S3 occurs over time. Therefore, as represented by the sign Δ in FIG. 7, a threshold value may be set for the increase rate Δ of the total accumulated value S3 with respect to the time, and it can be also regarded that the replacement is ended when the increase rate Δ becomes not more than the threshold value. In this case, it is necessary to modify the processing in Step S205 so that “YES when not more than the threshold value” is held. In this method, the liquid quantity taken into the processing space SP does not need to be known in advance, and even in such a case, it is possible to properly determine the replacement end time.

The process (Steps S104 to S106) after it is determined that the replacement is ended may be the same as that shown in FIG. 2. When the type of substrate S and the processing recipe are the same, the reference profile acquired in Step S001 can be used commonly to a plurality of substrates S. Therefore, when it is determined that the process for a next substrate S is needed in Step S106, Step S001 does not need to be performed again and the process from Step S101 has only to be repeated.

As described above, according to the replacement end time determination method in this embodiment, the replacement end time is determined not only by comparison between the density profile acquired in the wet state and the reference profile acquired in the dry state but also on the basis of quantitative information included in the difference. Specifically, by considering the difference as an index indicating the quantity of the liquid to be replaced contained in the processing fluid and using a result of quantitatively estimating the quantity of the liquid to be replaced which is discharged, ending of the replacement is determined.

For this reason, even in a case where the two profiles accidentally coincide with each other, for example, due to a variation in the density of the processing fluid itself, the detection error, or the like, this does not immediately lead to the determination result indicating that the replacement is ended. By doing so, it is possible to perform proper determination with high robustness.

As described above, in this embodiment, the processing chamber 100 functions as a “chamber” of the present invention and the support tray 15 functions as a “substrate support member” of the present invention. Further, each of the density detectors 552 and 556 correspond to a “density detector” and a “mass flow meter” of the present invention. The fluid supplier 57 and the fluid discharger 55 as a unit function as a “fluid supply/discharge part” of the present invention. The control unit 90 functions as a “controller” of the present invention. Furthermore, a profile referred to simply as the “reference profile” in the above-described description corresponds to a “reference density profile” of the present invention.

Further, the present invention is not limited to the above-described embodiment, and various changes other than the aforementioned ones can be made without departing from the gist of the present invention. For example, in the above-described embodiment, the replacement end time determination is performed on the basis of the accumulated value of the difference between the density profile which is actually measured in the supercritical drying process and the reference profile. However, the criterion of determination described in PTL 2, i.e., “it is regarded that the replacement is ended when both the profiles coincide with each other” is still effective and both these criteria may be used.

In other words, with these two criteria of determination in combination, for example, a criterion of determination indicating that “it is regarded that the replacement is ended when the two profiles coincide with each other and the total accumulated value of the density difference becomes larger than the threshold value” or another criterion of determination indicating that “it is regarded that the replacement is ended when the two profiles coincide with each other or the total accumulated value of the density difference becomes not less than the threshold value” may be adopted. Further, both the determination method with the threshold value set for the above-described total accumulated value S3 and the determination method with the threshold value set for the time change quantity Δ may be used.

Furthermore, for example, in the above-described embodiment, the replacement end time determination method according to the present invention is applied to the object to optimize the processing recipe of the supercritical drying process. However, the target to which this method is applied is not limited to this. For example, in performing a next process step after the replacement process is ended, the present invention may be used for the determination of the end time.

Further, for example, in the substrate processing apparatus 1 of the above-described embodiment, the density detectors 552 and 556 are provided in the discharge flow path of the processing fluid, as long as the density of the fluid in the chamber can be detected. However, the arrangement position of these detectors is not limited to the above-described example. Furthermore, the discharge flow paths are connected to an upper space and a lower space of the support tray 15 in the processing space SP and the density detectors are disposed in these discharge flow paths, respectively, in the above-described embodiment. However, the position of the discharge flow path and the number thereof may be arbitrarily set and the arrangement of the density detectors may be accordingly changed as appropriate. Further, the density detector is not limited to the Coriolis flow meter.

Further, various chemical substances used in the process of the above-described embodiment are only some examples, and various other chemical substances can be used instead of these if those chemical substances conform to the technical idea of the present invention described above.

As the specific embodiment has been illustrated above, in the present invention, for example, it is possible to determine that the replacement is ended when the accumulated value of the difference reaches the threshold value. Since the accumulated value is a value indexing the total quantity of the liquid to be replaced which has been discharged until then, there is a rational meaning in that it is determined that the replacement is ended when the total discharge quantity reaches a certain value. Particularly, in a case where the quantity of the liquid to be replaced which is taken into the chamber is known in advance, by setting a threshold value in accordance with the quantity, it is possible to accurately grasp the timing of completely discharging the liquid to be replaced.

Further, as another determination method, for example, it is possible to determine that the replacement is ended when the time change quantity of the accumulated value becomes smaller than the threshold value. An increase in the accumulated value becomes duller as the quantity of the liquid to be replaced remaining in the chamber decreases, and the accumulated value does not further increase when the liquid to be replaced is completely discharged. Therefore, by determining that the replacement is ended when the time rate of change in the accumulated value becomes zero or sufficiently small, it is possible to accurately grasp the timing of completely discharging the liquid to be replaced.

It is possible to detect the density of the processing fluid, for example, on the discharge flow path for discharging the processing fluid from the chamber. In such a configuration, it is possible to estimate the quantity of the liquid to be replaced to be discharged, from the density change of the processing fluid discharged from the chamber.

Herein, in a case where the substrate supported in a horizontal position by a flat plate-like substrate support member is accommodated in the chamber, it is desirable that the density should be detected in each of the upper discharge flow path for discharging the processing fluid flowing above the substrate and the lower discharge flow path for discharging the processing fluid flowing below the substrate support member and the total of the difference should be accumulated in each of the upper discharge flow path and the lower discharge flow path.

Further, for example, it is desirable that the reference density profile should be acquired in a state where the substrate with no liquid to be replaced adhering thereto is accommodated in the chamber. In such a configuration, since the difference of the condition from the actual processing is only whether or not there is a liquid to be replaced, it is possible to acquire the reference density profile in accordance with the actual processing. Therefore, it becomes possible to perform the replacement end time determination using the result with higher accuracy.

Furthermore, in this invention, the density of the processing fluid can be measured, for example, by a mass flow meter disposed on the discharge flow path for discharging the processing fluid from the chamber. Since the mass flow meter can detect the density of the processing fluid flowing on the path in real time, the mass flow meter can be suitably applied to the object of the present invention to occasionally detect the density of the processing fluid on the discharge flow path.

This invention can be applied to processings in general for replacing a liquid to be replaced by using a processing fluid introduced into a chamber. For example, this invention can be suitably applied to a substrate drying processing for drying a substrate such as a semiconductor substrate or the like by a supercritical fluid.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A replacement end time determination method in a process of replacing a liquid to be replaced by a processing fluid in a supercritical state in a chamber, the replacement end time determination method comprising:

maintaining the processing fluid in the chamber in the supercritical state by supplying and discharging the processing fluid into and from the chamber in which the liquid to be replaced is present in accordance with a predetermined supply/discharge recipe for filling an inside of the chamber with the processing fluid in the supercritical state;

detecting a density of the processing fluid discharged from the chamber and obtaining an accumulated value by accumulating a difference between a detection value at each time and a value indicated by a reference density profile acquired in advance; and determining whether or not replacement of the liquid to be replaced by the processing fluid is ended, on a basis of the accumulated value and a threshold value corresponding to a quantity of the liquid to be replaced, wherein the reference density profile is acquired as a density profile representing a time change of the density, which is acquired by detecting the density of the processing fluid in the chamber while supplying and discharging the processing fluid into and from the chamber in accordance with the supply/discharge recipe in a state where the liquid to be replaced is not present in the chamber.

2. The replacement end time determination method according to claim 1, wherein the replacement is determined to be ended when the accumulated value of a difference reaches the threshold value.

3. The replacement end time determination method according to claim 1, wherein the replacement is determined to be ended when a time change quantity of the accumulated value becomes smaller than the threshold value.

4. The replacement end time determination method according to claim 1, wherein the density is detected on a discharge path for discharging the processing fluid from the chamber.

5. The replacement end time determination method according to claim 4, wherein:

a substrate is accommodated in the chamber while being supported in a horizontal position by a flat plate-like substrate support member;

the density is detected in each of an upper discharge flow path for discharging the processing fluid flowing above the substrate in the chamber and a lower discharge flow path for discharging the processing fluid flowing below the substrate support member; and a total of the difference is accumulated in each of the upper discharge flow path and the lower discharge flow path.

6. A substrate processing method, comprising:

accommodating a substrate with a liquid to be replaced adhering thereto in a chamber;

maintaining a processing fluid in the chamber in a supercritical state by supplying and discharging the processing fluid into and from the chamber in accordance with a predetermined supply/discharge recipe for filling an inside of the chamber with the processing fluid in the supercritical state;

detecting a density of the processing fluid discharged from the chamber;

obtaining an accumulated value by accumulating a difference between a detection value at each time and a value indicated by a reference density profile acquired in advance;

determining whether replacement of the liquid to be replaced by the processing fluid is ended or not on a basis of the accumulated value and a predetermined threshold value corresponding to a quantity of the liquid to be replaced; and drying the substrate by discharging the processing fluid and decompressing the inside of the chamber when it is determined that the replacement is ended, wherein the reference density profile is acquired as a density profile representing a time change of the density, which is acquired by detecting the density of the processing fluid in the chamber while supplying and discharging the processing fluid into and from the chamber in accordance with the supply/discharge recipe in a state where the liquid to be replaced is not present in the chamber.

7. The substrate processing method according to claim 6, wherein the reference density profile is acquired in a state where the substrate with no liquid to be replaced adhering thereto is accommodated in the chamber.

8. A substrate processing apparatus, comprising:

a chamber which has an internal space capable of accommodating a substrate with a liquid to be replaced adhering thereto;

a fluid supply/discharge part which supplies a processing fluid into the chamber and discharges the processing fluid from the chamber;

a density detector which detects a density of the processing fluid discharged from the chamber; and a controller which controls the fluid supply/discharge part on a basis of a detection result of the density detector, wherein the controller performs the replacement end time determination method according to claim 1 and, when the controller determines that the replacement is ended, the controller causes the fluid supply/discharge part to discharge the processing fluid to decompress an inside of the chamber to dry the substrate.

9. The substrate processing apparatus according to claim 8, wherein:

the substrate is accommodated in the chamber while being supported in a horizontal position by a flat plate-like substrate support member;

the density detector detects the density in each of an upper discharge flow path for discharging the processing fluid flowing above the substrate and a lower discharge flow path for discharging the processing fluid flowing below the substrate support member; and the controller accumulates a total of the difference in each of the upper discharge flow path and the lower discharge flow path.

10. The substrate processing apparatus according to claim 8, wherein the density detector detects the density of the processing fluid by a mass flow meter disposed on a discharge flow path for discharging the processing fluid from the chamber.

* * * * *